United States Patent
Rahman

(10) Patent No.: US 12,342,172 B2
(45) Date of Patent: Jun. 24, 2025

(54) OPTIMIZED SECURITY MODE COMMAND PROCEDURE TO REDUCE COMMUNICATION SETUP FAILURES

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 324 days.

(21) Appl. No.: 17/507,202

(22) Filed: Oct. 21, 2021

(65) Prior Publication Data

US 2023/0126490 A1   Apr. 27, 2023

(51) Int. Cl.
| | | |
|---|---|---|
| *H04W 12/60* | (2021.01) | |
| *H04W 12/61* | (2021.01) | |
| *H04W 36/00* | (2009.01) | |

(52) U.S. Cl.
CPC .......... *H04W 12/61* (2021.01); *H04W 12/66* (2021.01); *H04W 36/0038* (2013.01)

(58) Field of Classification Search
None
See application file for complete search history.

(56) References Cited

U.S. PATENT DOCUMENTS

| | | | | |
|---|---|---|---|---|
| 2012/0294444 A1* | 11/2012 | Feng | ...................... | H04L 63/06 380/270 |
| 2013/0039287 A1* | 2/2013 | Rayavarapu | ........ | H04W 68/005 370/329 |
| 2013/0310006 A1* | 11/2013 | Chen | ...................... | H04W 12/04 455/411 |
| 2015/0245214 A1* | 8/2015 | Bellam | ................ | H04L 9/0891 455/411 |
| 2017/0195882 A1* | 7/2017 | Liao | ...................... | H04W 76/30 |
| 2017/0223538 A1* | 8/2017 | Hahn | .................... | H04W 12/04 |
| 2018/0054767 A1* | 2/2018 | Gholmieh | ....... | H04W 36/00226 |
| 2019/0158282 A1* | 5/2019 | Liu | ....................... | H04W 12/03 |
| 2019/0223063 A1* | 7/2019 | Palanigounder | ...... | H04W 12/06 |
| 2019/0349764 A1* | 11/2019 | Suh | ....................... | H04L 9/0838 |
| 2021/0051530 A1* | 2/2021 | Venkataraman | ...... | H04W 88/06 |

* cited by examiner

*Primary Examiner* — San Htun
(74) *Attorney, Agent, or Firm* — Lee & Hayes, P.C.

(57) ABSTRACT

Systems, devices, and techniques described herein relate to use of an optimized security mode command (SMC) procedure for securing communications. When connecting to a different cellular network (e.g., from a $5^{th}$ generation (5G) Radio Access Network (RAN)) to a different cellular network (e.g., a $4^{th}$ generation (4G) RAN), a User Equipment (UE) performs the SMC procedure without processing subsequent commands until a period of time has elapsed. Instead of allowing the UE to process subsequent commands received close in time to receiving the SMC, the subsequent commands may be delayed/suspended so that the UE has time to perform the SMC procedure and establish secure communications with the 4G LTE network. According to some examples, the delay is set to a period of time (e.g., 1 ms, 10 ms, or some other value) such that the subsequent command does not interfere with performing the SMC procedure.

11 Claims, 5 Drawing Sheets

OPTIMIZED SECURITY MODE COMMAND PROCEDURE TO REDUCE COMMUNICATION SETUP FAILURES

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies, among other forthcoming technologies, to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
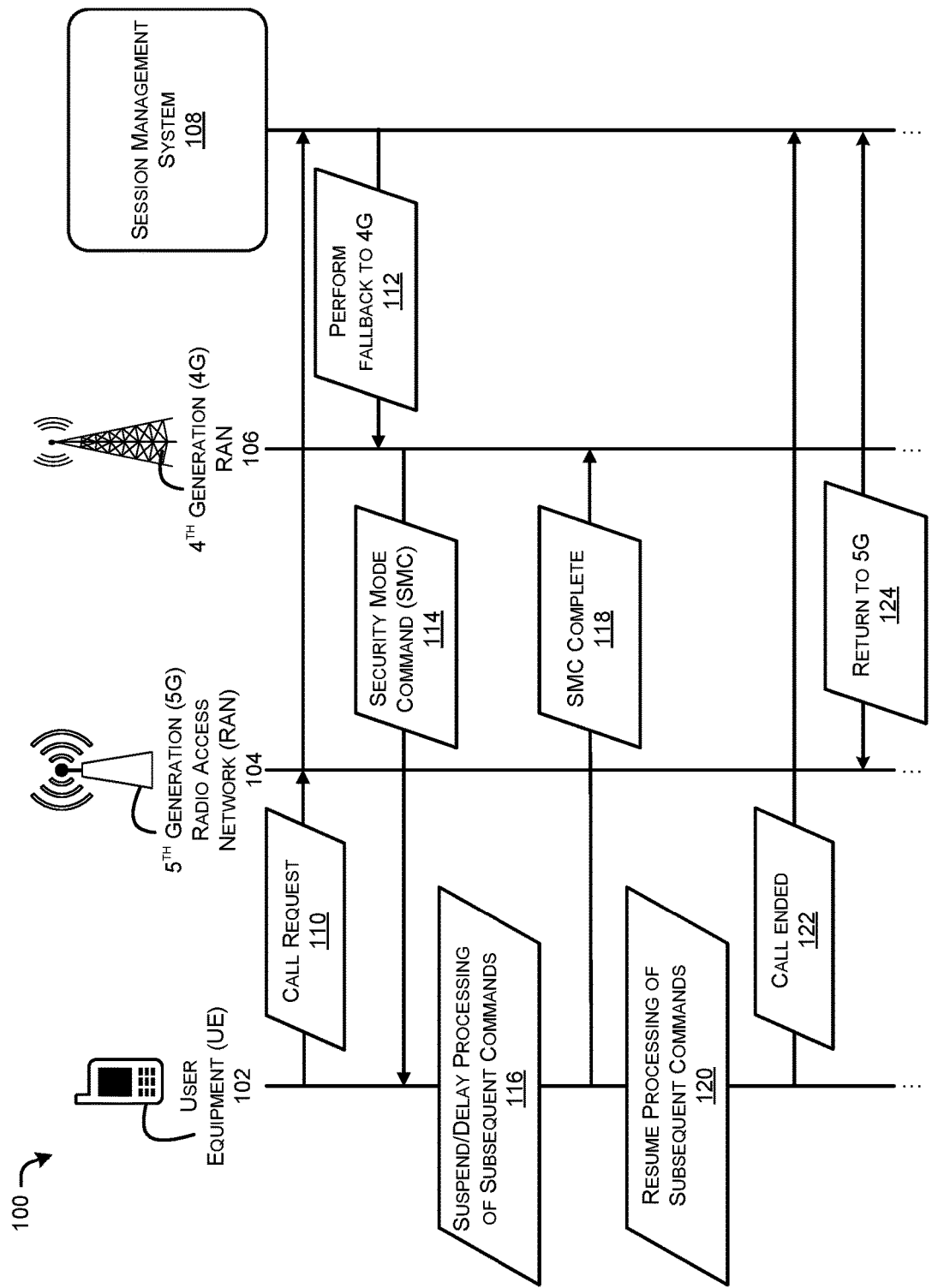
FIG. 1 illustrates example signaling between a User Equipment (UE) and various components of one or more cellular networks, such as a 4th Generation (4G) cellular network and a 5th Generation (5G) cellular network.

The systems, devices, and techniques described herein relate to optimization of a security mode command (SMC) procedure for securing communications between a cellular tower and a user equipment (UE). With the development of $5^{th}$ generation (5G) Radio Access Network (RAN) telecommunications technology, 5G network systems that support a broad variety of services may be developed and deployed. However, during an initial deployment, some services may not be immediately supported by particular 5G network systems. For instance, a 5G RAN may be capable of providing some services to a UE but be incapable of providing other services to the UE.

As an example, a 5G RAN may be capable of providing data services but incapable of providing voice services to the UE, because the 5G network system may lack functionality to establish a particular type of bearer (e.g., a dedicated bearer), a particular type of flow (e.g., a Guaranteed Bitrate (GBR) Flow), or a particular type of Protocol Data Unit (PDU) session required to accommodate the voice services. In some cases, the 5G RAN may lack software that would allow the 5G RAN to accommodate the voice services, even though the 5G RAN may be installed with software that allows the 5G RAN to deliver services via a default, type of Protocol Data Unit (PDU) session.

Today, during the early stages of deploying a 5G RAN, EPS (Evolved Packet System) Fallback (EPSFB) from the 5G network to a $4^{th}$ generation (4G) Long Term Evolution (LTE) RAN may be used to establish voice calls. The term "fallback", "EPS fallback," "4G fallback," and their equivalents, as used herein, can refer to a process by which a 5G network system connected to a UE can cause a different network system, such as an Evolved Packet System (EPS) to provide services to the UE. The services may be of a type that is unsupported by a first network (e.g., a 5G network), in some cases. As an example, if a UE camping on a 5G New Radio (NR) network initiates a voice call, EPSFB may be used.

In some cases, a communication setup failure (which may also be referred to herein as "a call setup failure", or "setup failure") may occur when connecting to a RAN. For example, a setup failure may occur when attempting to secure communications between the UE and RAN, and/or when processing some other command/message during a time the communication session is being established. A setup failure results in a poor user experience for a user of the UE since the user is not able to make the call and/or perform some other requested operation. As an example, a setup failure can result for a UE when the UE attempts to process subsequent commands/messages/inquiries that are received close in time to receiving a SMC.

Generally, a SMC is used to command the UE for the activation of Access Stratum (AS) security that comprises of the integrity protection of radio resource control (RRC) signaling (SRBs) as well as the ciphering of RRC Signaling Radio Bearers (SRBs) and user plane Data Radio Bearers (DRBs). As used herein, a "subsequent command" is a command that is received by a UE within some predetermined time from receiving a SMC and/or a command that is received by the UE before successful completion of the SMC procedure.

Using techniques described herein, however, the processing of subsequent commands by the UE are delayed/suspended such that the SMC procedure can be performed (e.g., by the UE) before attempting to process the subsequent commands. As a result, the establishment of a communication session (e.g., a voice call) may be more successful between the UE and the cell tower as compared to prior techniques that do not delay/suspend the processing of subsequent commands received by the UE.

As an example, assume that a UE is initially connected to a 5G network. The 5G network may be a standalone (SA) network, or a non-standalone (NSA) network. When a user initiates a voice call, the UE falls back to a 4G network (e.g., a 4G Long Term Evolution (LTE)) network) when the 5G network does not support the voice call. During call setup, a SMC procedure is performed to secure communications between the UE and the 4G LTE network. In some configurations, a E-UTRAN Node B (which may also be referred to herein as an Evolved Node B and can be abbreviated as eNodeB or eNB) of the 4G LTE network sends a SMC to the UE during call setup. An eNodeB initiates this procedure prior to the establishment of Signaling Radio Bearer2 (SRB2) and Data Radio Bearers (DRBs). Instead of allowing the UE to process subsequent commands received close in time to receiving the SMC, the processing of the subsequent commands may be delayed/suspended so that the UE has time to perform the SMC procedure and establish secure communications with the 4G LTE network. According to some examples, the delay is set to a delay period of time value (e.g., 1 ms, 10 ms, or some other value) such that the subsequent command will not interfere with performing the SMC procedure and will be delayed/suspended till the expiration of the period of time. In some configurations, an authorized user may configure/specify the delay (e.g., via a command line interface, a user interface, or some other type of interface).

Various implementations represent improvements to the field of telecommunications networks. In particular, various implementations enable efficient secure connections to be established after fallback to a different network (e.g., a 4G network) when requested services (e.g., voice services) cannot be provided through a 5G network via one or more call requirements. By delaying/suspending processing of subsequent commands, user experience is improved and resources of the 4G/5G network may be used to service other UEs. By delaying the processing of subsequent messages, fewer call setup failures will result that prevent the UE from making the call. This results in a better service experience for the user.

The various functions, gateways, nodes, and components discussed herein can be implemented either as a network element on a dedicated hardware, as a software instance running on a dedicated hardware, or as a virtualized function instantiated on an appropriate platform, such as a cloud infrastructure. The systems, devices, and techniques described herein can be applied to various implementations of using an optimized SMC procedure. In certain instances, various components of a 4th Generation (4G) cellular network can include, but are not limited to, a Mobility Management Entity (MME), a Serving Gateway (SGW), a Packet Data Network (PDN) Gateway (PGW), a Home Subscriber Server (HSS), an Access Network Discovery and Selection Function (ANDSF), and/or an evolved Packet Data Gateway (ePDG). An SGW can include a component that handles user-plane data (SGW-U) and a component that handles control-plane data (SGW-C). A PDN can include a component that handles user-plane data (PDN-U) and a component that handles control-plane data (PDN-C).

In some examples, various components of a 5th Generation (5G) cellular network can include, but are not limited to, a network exposure function (NEF), a network resource function (NRF), an authentication server function (AUSF), an access and mobility management function (AMF), a policy control function (PCF), a session management function (SMF), a unified data management (UDM) function, a user plane function (UPF), and/or an application function (AF). For example, some or all of the functions discussed herein can perform the SDC procedure and operations relating to fallback and return to the different network after fallback. Thus, the system, devices, and techniques broadly apply to using an optimized SMC procedure to reduce setup failures, and are not limited to a particular context or function, as discussed herein.

As used herein, the terms "communication session," "session," and their equivalents, can refer to an exchange of data between two or more communicating nodes or devices. A call (e.g., a voice call, a video call, or the like) may be an example of a communication session. A communication session can be temporary, such that it is established at a first time and ceased at a second time. In various implementations, a communication session includes the transfer of user plane data between two or more nodes.

As used herein, the term "node," and its equivalents, can refer to one or more devices that transmit and/or receive data in a network. In some instances, a first node can transmit and/or receive data from a second node.

As used herein, the terms "network path, "path," and their equivalents, can refer to a pathway over which data can be transferred between at least two terminal nodes or devices. In some cases, a path may include one or more intermediary nodes and/or one or more interfaces between the terminal nodes.

The term "dedicated bearer," and its equivalents, as used herein, can refer to a means to deliver data between two or more nodes of a network that is associated with one or more minimum Quality of Service (QoS) requirements (e.g., a Guaranteed Bit Rate (GBR), a priority level, a packet delay budget, a packet error loss rate, etc.). In some examples, the dedicated bearer may traverse one or more intermediary nodes in the network that carry the data according to the one or more minimum QoS requirements.

The systems, devices, and techniques described herein can be implemented in a number of ways. Example implementations are provided below with reference to the following figures.

FIG. 1 is a diagram illustrating example signaling 100 between a User Equipment (UE) 102 and various components of one or more cellular networks, such as a 4th Generation (4G) cellular network and a 5th Generation (5G) cellular network, as described herein.

In accordance with various examples described herein, the terms "UE," "user device," "wireless communication device," "wireless device," "communication device," "mobile device," and "client device," can be used interchangeably herein to describe any UE (e.g., the UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

In general, the UE 102 can be implemented as any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

The UE 102 is configured to utilize various RANs, such as a 5G RAN 104 and/or a 4G RAN 106, in order to access an external network (not pictured), receive downlink data from the external network, and/or transmit uplink data to the external network. The external network can include one or more Wide Area Networks (WANs). In general, the external network is agnostic to the access technology that is used to connect a UE to the external network. In this manner, the 5G RAN 104 and/or the 4G RAN 106 can include and/or be substituted for a 3GPP RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. In some instances, the 5G RAN 104 and/or the 4G RAN 106 can include a Wi-Fi Access Point (AP). Providing access to the external network through non-3GPP RANs has opened the door to recent advancements in IMS-based services, such as the introduction of Wi-Fi calling, which allows users to initiate and receive calls over an available Wi-Fi AP. Environments can include any number and type of base stations representing any number and type of macrocells, microcells, picocells, or femtocells, for example, with any type or amount of overlapping coverage or mutually exclusive coverage.

In general, a user can further utilize the UE 102 to communicate with other users and associated UEs via an Internet Protocol (IP) Multimedia Subsystem (IMS) core (sometimes referred to as the "IMS core network," the "IMS network," the "Core Network (CN)," or the "IM CN Subsystem"), which can be at least a portion of the external network. IMS is an architectural framework defined by the $3^{rd}$ Generation Partnership Project (3GPP) for delivering Internet Protocol (IP) multimedia to a UE, such as the UE 102. The IMS core can be maintained and/or operated by one or more service providers, such as one or more wireless carriers ("carriers"), that provide IMS-based services to users who are associated with UEs, such as the UE 102. For example, a service provider can offer multimedia telephony services that allow a user to call or message other users via the IMS core using his/her UE. A user can also utilize an associated UE to receive, provide, or otherwise interact with various different IMS-based services by accessing the IMS core. It is to be appreciated that any number of base stations and/or IMS nodes can be included in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order for a UE (e.g., the UE 102) to access these services (e.g., telephony services), the UE may be configured to request establishment of a communication session, or another UE may be configured to request establishment of the communication session. In the case of telephony services, the communication session can comprise a call (e.g., a voice-based communication session, such as a VoLTE call, or a Wi-Fi call).

A session management system 108 is configured to manage communication sessions. According to some configurations, the session management system 108 may handle fallback to a 4G network to support a voice call for the 5G network and a return to the 5G network after the voice call has ended. In various implementations, the session management system 108 can include a Session Management Function (SMF) associated with a 5G network. In general, the SMF can be implemented as a network function including functionality to manage communication sessions by and between UEs, and/or to provide internet protocol (IP) addresses to the UEs. In some instances, the SMF can select a User Plane Function (UPF) to provide services to the UE 102 in response to receiving a request from the UE 102.

In some configurations, the session management system 108 can include a Packet Data Network (PDN) Gateway Control plane function (PGW-C) associated with a Control and User Plane Separation (CUPS) architecture of a 4G network. In general, the PGW-C can be implemented as a software node that handles control-plane data traffic between the 4G network and one or more external networks (e.g., an IMS network, the Internet, and the like). The PGW-C can, in particular examples, perform policy enforcement functions, charging support functions, interception functions, and the like. In certain implementations, the SMF and the PGW-C can be collocated on the same device or distributed on the same system that includes a set of devices.

As illustrated, the UE 102 may be initially attached to the 5G RAN 104. In some cases, the UE 102 may be dual-connected to the 5G RAN 104 and the 4G RAN 106. In various implementations, the UE 102 may be located in a coverage area associated with the 5G RAN 104 and a coverage area associated with the 4G RAN 106 and may be capable of receiving and transmitting signals wirelessly with the 5G RAN 104 and the 4G RAN 106.

The UE 102 may transmit a call request 110 to the 5G RAN 104. While FIG. 1 illustrates an example in which UE 102 initiates a call, in some cases, another device initiates the call with the UE 102. In particular implementations, the call request 110 may be packaged in such a way that makes it unrecognizable to the 5G RAN 104. The 5G RAN 104 may forward the call request 110 to the session management system 108 without interpreting or processing the call request 110.

In response to receiving the call request 110, the session management system 108 may attempt to establish the call using the 5G RAN. In some examples, the 5G RAN 104 may determine that the 5G RAN 104 cannot provide the requested service. In particular instances, the 5G RAN 104 may lack software that would otherwise enable the 5G RAN 104 to set up the call. In some examples, the requested call may be for voice services and the 5G RAN 104 may not support voice services. In some instances, the 5G RAN 104 cannot setup the specified dedicated bearer, the particular type of flow (e.g., a guaranteed bitrate (GBR) flow), or the particular type of PDU session that can fulfill any call requirement(s).

Upon determining that the 5G RAN 104 does not support the call request 110, the session management system 108 may initiate a fallback process. For example, the session management system 108 may initiate an EPS fallback process 112 that may include one or more functions performed by the session management system 108.

The session management system 108 may initiate the establishment of the call through the 4G RAN 106. Specifically, the session management system 108 may transmit, to the 4G RAN 106, a call setup request (not shown). The second call setup request may instruct the 4G RAN 106 to establish a dedicated bearer that is associated with the 4G network.

During the communication session/call setup process, the 4G RAN 106 may send a SMC to the UE 102. As discussed briefly above, the SMC 114 can be used to command the UE 102 for the activation of AS security. In some examples, the UE 102 performs the SMC procedure prior to the establishment of Signaling Radio Bearer2 (SRB2) and Data Radio Bearers (DRBs). AS security comprises of the integrity protection of RRC signaling (SRBs) as well as the ciphering of RRC signaling (SRBs) and user plane data (DRBs). The integrity protection algorithm is common for signaling radio bearers SRB1 and SRB2. The ciphering algorithm may be common for the different radio bearers (i.e. SRB1, SRB2 and DRBs).

After receiving the SMC, the UE 102 may calculate keys, checks MAC (Message Authentication Code) of SMC and if correct, sends back an integrity protected and ciphered SMC complete message 118 to the 4G RAN. If the SMC message fails the integrity protection check, then the UE 102 may send a security mode failure message (not shown) to the 4G RAN (e.g., an eNodeB) that can result in a setup failure. It has been found that prior to using techniques described herein for an optimized SMC procedure, a setup failure can result for the UE 102 when the UE 102 attempts to process subsequent commands that are received close in time to receiving a SMC and before the SMC procedure is complete.

According to some examples, the UE 102 suspends/delays the processing of subsequent commands/messages 116 sent to the UE 102 such that the SMC procedure can be performed by the UE 102, and/or by some other component, before processing the subsequent commands. As a result of suspending/delaying the processing of the subsequent commands 116, and in some cases other operations to be performed by the UE 102, the call setup may be more successful between the UE 102 and the 4G RAN 106 as compared to prior techniques that do not delay/suspend the processing of subsequent commands received by the UE 102. According to some configurations, the processing is delayed/suspended for some period of time (e.g., a 1-50 ms, or some other time). In some examples, the UE 102, the session management system 108, and/or some other device or component may utilize a timer to assist in determining when the period of time has expired. Generally, the processing of subsequent commands is delayed/suspended until the SMC procedure is completed. In some examples, the processing of subsequent commands is delayed/suspended until the UE 102 sends the SMC complete message 118. In some configurations, an authorized user may configure/specify the delay (e.g., via a command line interface, a user interface, or some other type of interface).

When the SMC procedure is complete, the UE 102 may send an SMC complete message 118 to the 4G RAN 106 and resume/begin processing of the subsequent commands 120 that were delayed/suspended. In other examples, the UE 102 may begin processing of the subsequent messages at the expiration of a specified time period. At this point, the communication session to establish the call may be established.

The UE 102 remains connected to the 4G RAN 106 during the time of the call. In some examples, after the call has ended 122, a check is performed as to whether the UE has 5G coverage. According to some configurations, the UE 102 performs the check to determine 5G coverage. When the UE 102 does have 5G coverage, the 4G connection is released 118 and the UE 102 connects to the 5G network 104. When the UE does not have 5G coverage, the 5G coverage is periodically checked to determine when the UE has coverage.

In various implementations, the UE 102, the session management system 108, and/or some other device or component may utilize a timer to periodically check whether or not the UE 102 has 5G coverage. For example, when the UE 102 does not have 5G coverage after the call has ended, the timer may be used as a "redirect timer" that when the timer is expired, the UE 102 re-checks to determine if the UE 102 has 5G coverage. As discussed above, when the UE 102 does have 5G coverage, the 4G call is released 118, and the UE 102 is returned to the 5G network 104.

Figure 2:
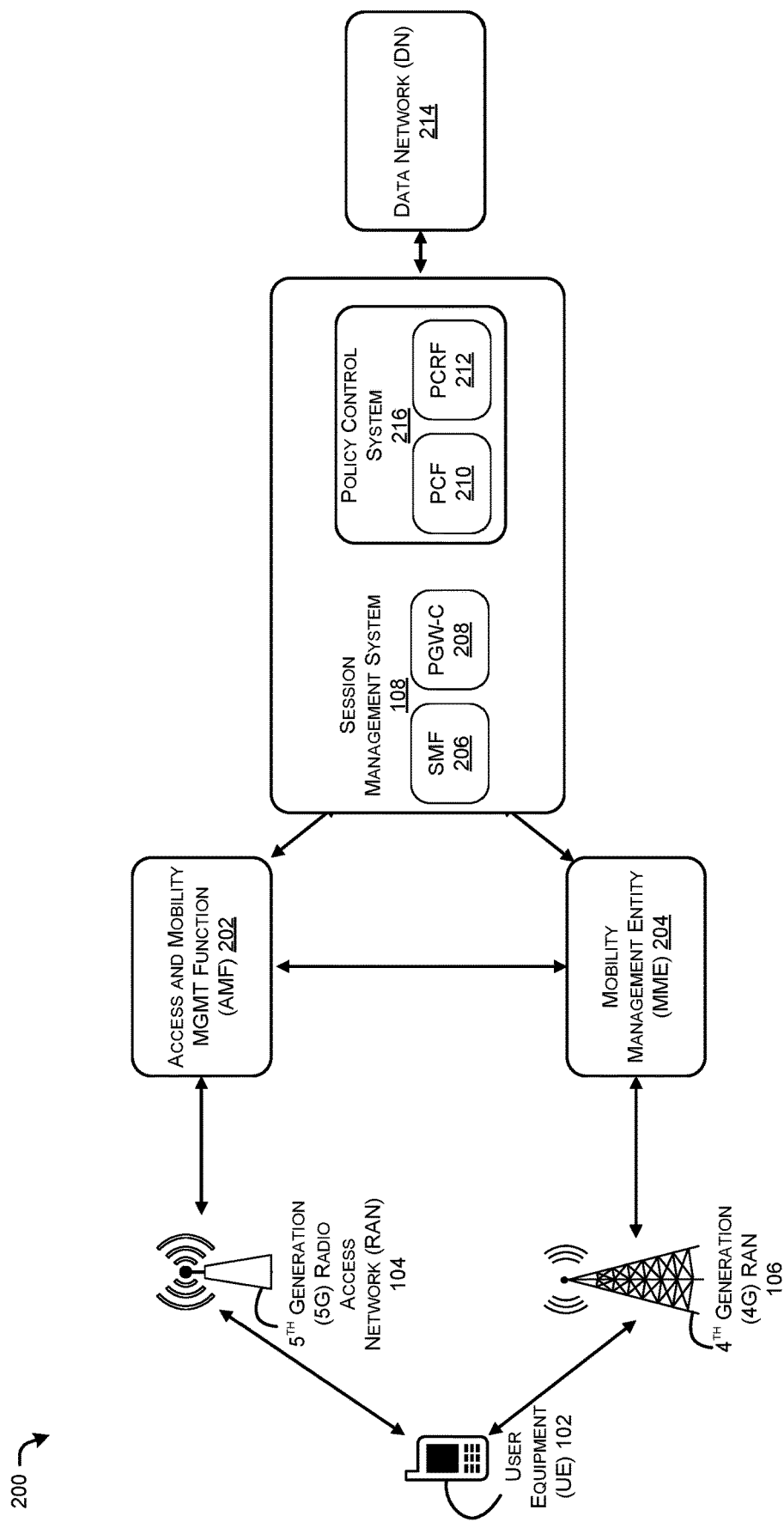
FIG. 2 illustrates an example environment that illustrates delaying processing of subsequent commands received after a security mode command.

FIG. 2 illustrates an example environment 200 that illustrates delaying processing of subsequent commands received after receiving a security mode command. The environment 200 may include the User Equipment (UE) 102, the 5th Generation (5G) Radio Access Network (RAN) 104, the 4th Generation (4G) RAN 106, and the session management system 108 which includes a policy control system 216, some of which are described above with reference to FIG. 1.

The environment 200 may further include an Application Management Function (AMF) 202 connected between the 5G RAN 104 and the session management system 108. The AMF 202 may be part of a 5G network, along with the 5G RAN 104. In general, the AMF 202 can be implemented as a network function including functionality to provide UE-based authentication, authorization, mobility management, etc., to various UEs. In some instances, the AMF 202 can include functionality to terminate a RAN control plane interface between the UE 102 and other functions on the network. In some instances, the AMF 202 can include functionality to perform registration management of the UE 102 in a network, connection management, reachability management, mobility management, access authentication, access authorization, security anchor functionality (e.g., receiving and/or transmitting security keys during registration/authorization), and the like.

A Mobility Management Entity (MME) 204 can be connected between the 4G RAN 106 and the session management system 108, in some instances. In general, the MIME 204 can be implemented as a network function that can be involved in any of activating and deactivating bearers, choosing a Serving Gateway (SGW) for a session and/or UE, choosing a Packet Data Network (PDN) Gateway (PGW) for the session and/or UE, authenticating users by interacting with a Home Subscriber Server (HSS), generating and/or allocating temporary identities to UEs, handling security key management, enforcing UE roaming restrictions, and the like. In some instances, the AMF 202 and the MME 204 can exchange data, such as control plane data.

In various implementations, the session management system 108 may include a Session Management Function (SMF) 206 and a Packet Data Network (PDN) Gateway Control plane function (PGW-C) 208. In general, the SMF 206 can be implemented as a network function including functionality to manage communication sessions by and between UEs, and/or to provide internet protocol (IP) addresses to the UEs. In some instances, the SMF 206 can select a User Plane Function (UPF) to provide services to the UE 102 in response to receiving a request from the UE 102. In general, the PGW-C 208 can be implemented as a software node that handles control-plane data traffic between the 4G network and one or more external networks (e.g., an IMS network, the Internet, and the like). The PGW-C 208 can, in particular examples, perform policy enforcement functions, charging support functions, interception functions, and the like. In certain implementations, the SMF 206 and the PGW-C 208 can be collocated on the same device or distributed on the same system that includes a set of devices.

The session management system 108 may also include a policy control system 216 may be configured to establish a communication session between the UE 102 and one or more external devices. In particular cases, the policy control system 216 may be connected between the session management system 108 and an IMS network. In various implementations, the policy control system 216 can include a Policy Control Function (PCF) 210 of the 5G network. In general, the PCF 210 can be implemented as a network function including functionality to support unified policy framework to govern network behavior, provide policy rules to control plane functions and/or enforce such rules, and/or implement a front end to access subscription information relevant for policy decisions in a data repository.

In certain examples, the policy control system 216 can include a Policy and Charging Rules Function (PCRF) 212 of the 4G network. In general, the PCRF 212 can be implemented as a software node designated to determine and apply policy rules in the 4G network. In some cases, the PCRF 212 accesses one or more subscriber databases and makes policy decisions for subscribers (e.g., UE 102) active on the 4G network. The PCRF 212 can, in some instances, allocate network resources to particular subscribers engaged in communication sessions with particular Quality of Service (QoS) levels and charging rules.

The policy control system 216 may be connected to a Data Network (DN) 214. In general, the DN 214 can include any public or private network(s), such as any of the Internet, an Internet Protocol (IP) Media Subsystem (IMS) network, and the like. In addition, the DN 214 may include one or more devices that can receive and transmit data. For example, the DN 214 may include any of media server(s), user device(s), and the like.

In various implementations, a communication session may be setup between the UE 102 and an external device, such as a device connected to the DN 214. In some instances, the communication session may include the UE 102 exchanging data amounting to voice services with the DN 214.

As illustrated, the UE 102 may be attached to the 5G network 104 and/or the 4G network 106 at a particular point in time. For instance, the UE 102 may be dual connected to the 5G RAN 104 and the 4G RAN 106. As discussed above, in some cases, the 5G network 104 may not provide services requested by the UE 102 (e.g., a voice call). In these examples, the session management system 108 may initiate a fallback process to the 4G network 106 such that the requested service (e.g., the voice call) may be provided to the UE 102.

In some examples, the session management system 108 may initiate the establishment of a call through the 4G RAN 106. Specifically, the session management system 108 may transmit, to the 4G RAN 106, a call setup request. As discussed above, when the UE 102 begins connection to a RAN, such as 4G RAN 106, the UE 102 suspends/delays the processing of subsequent commands/messages sent to the UE 102 such that the SMC procedure can be performed by the UE 102 before processing the subsequent commands. As a result of suspending/delaying the processing of the subsequent commands, the call setup may be more successful between the UE 102 and the 4G RAN 106 as compared to prior techniques that do not delay/suspend the processing of subsequent commands received by the UE 102. According to some configurations, the processing is delayed/suspended for some period of time (e.g., a 1-50 ms, or some other time). In some examples, the delay time may change based on the processor and/or other capabilities of the UE 102. For instance, if the UE 102 has a faster processor/memory then the delay time may be shorter as compared to a UE 102 that has a slower processor. Generally, the processing of subsequent commands is delayed/suspended until the SMC procedure is completed. According to some examples, the processing of subsequent commands is delayed/suspended until the UE 102 sends the SMC complete message 118 as illustrated in FIG. 1.

The UE 102 remains connected to the 4G RAN 106 during the time of the call. After the call has ended, the UE 102 is returned to the 5G network. Since the UE 102 has better chance of success in setting up the call by delaying processing of subsequent messages, the user has a better experience as the UE 102 is connected to the 4G RAN for a voice call, as compared to previous techniques.

Figure 3:
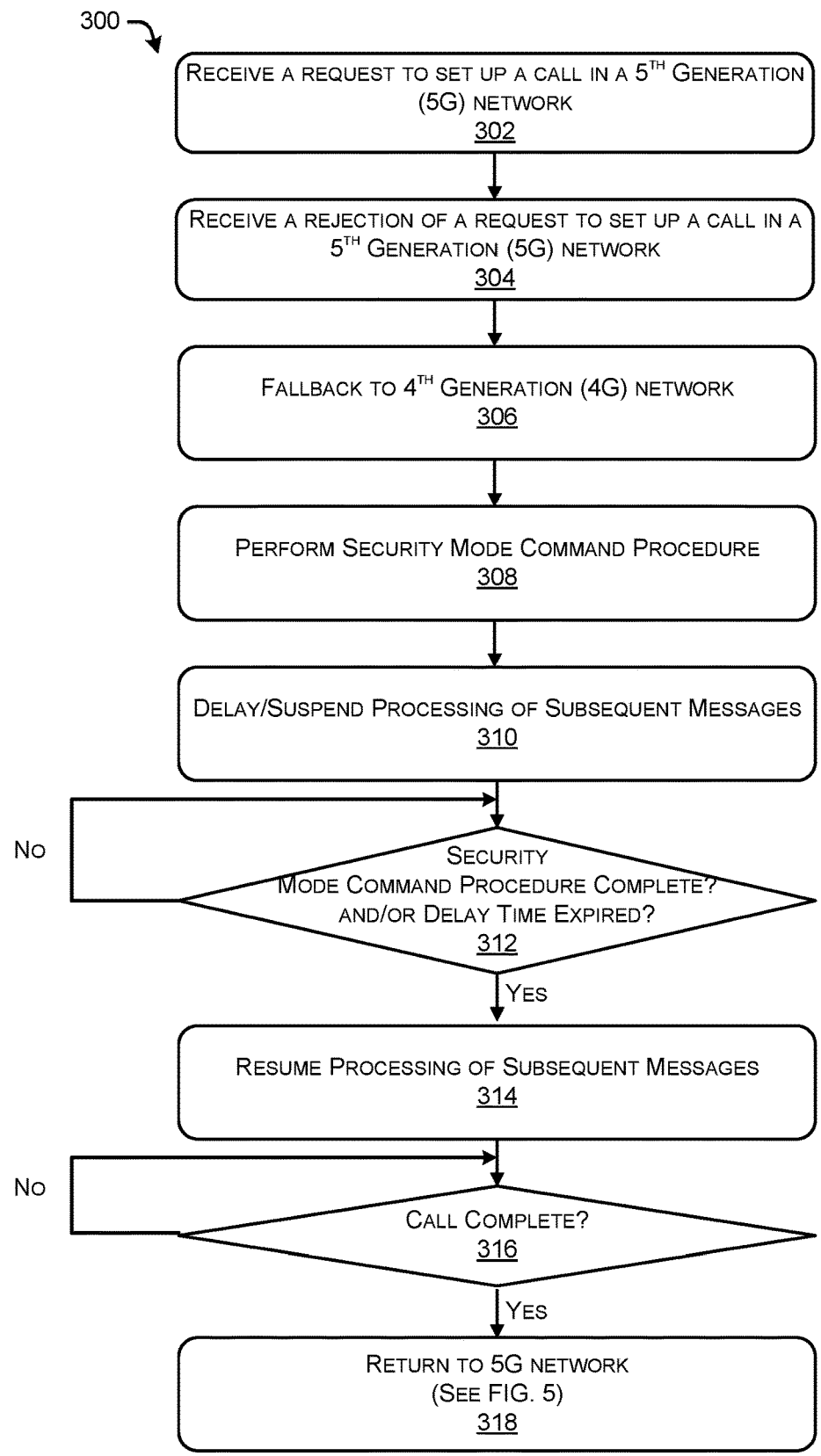
FIG. 3 illustrates an example process for using an optimized security mode command procedure when connecting to a radio access network.
Figure 4:
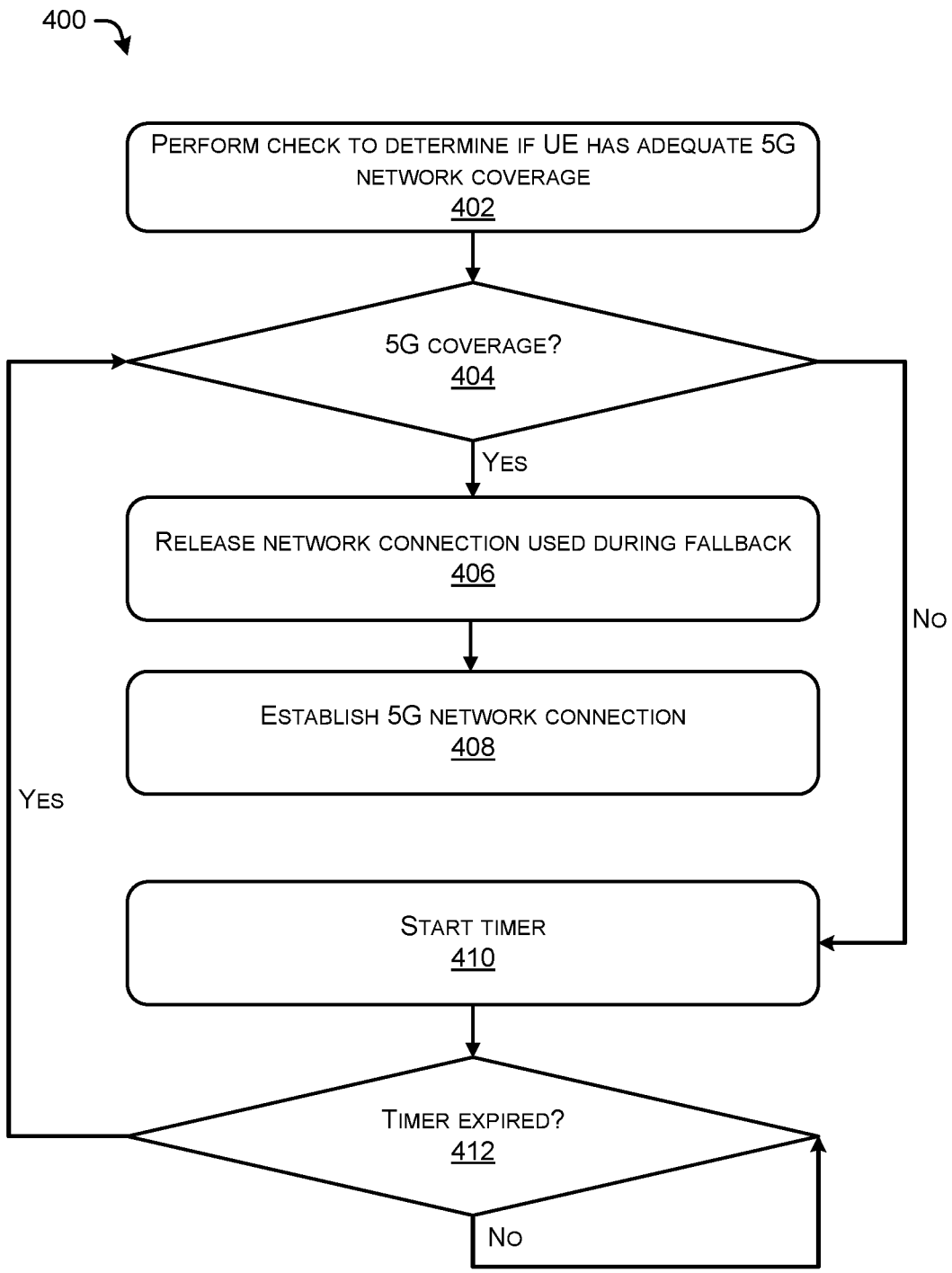
FIG. 4 illustrates an example process for returning to a 5G network after fallback to a different network.

FIGS. 3-4 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 3 illustrates an example process 300 for using an optimized security mode command procedure when connecting to a different radio access network. In some instances, the example process 300 is performed by the UE 102, a session management system (e.g., the session management system 108), a 5G RAN 104, and/or a 4G RAN 106.

At 302, a request is received to establish a call in a 5G RAN 104 is received. As discussed above, the request may be received from a UE 102 that is connected to the 5G RAN 104 and may also be connected to a 4G RAN 106.

At 304, a rejection of a request to set up a call in a 5th Generation (5G) network may be received. In particular implementations, the rejection may indicate that a 5G RAN has rejected a request to accommodate one or more requirements of the call (e.g., a particular Quality of Service (QoS) policy, a Guaranteed Bit Rate (GPR) policy, etc.). In some examples, the rejection may indicate that the 5G RAN lacks functionality to accommodate the call through the 5G network according to the call requirement(s). For instance, the 5G RAN 104 may lack software that would enable the 5G RAN 104 to establish a dedicated bearer or a particular type of Protocol Data Unit (PDU) session that can accommodate the call requirement(s). The rejection may be received from a node in the 5G network. In some examples, the rejection may be received from an AMF in the 5G network. According to some implementations, the rejection may be received over an interface between the AMF and the SMF. The AMF may be connected to the 5G RAN, in some examples.

At 306, a fallback to a 4G network is performed. As discussed above, the session management system 108 may fallback to the 4G RAN 106 to provide the requested servicing of the voice call.

At 308, a security mode command procedure is performed. As discussed above, a component of the 4G RAN 106, such as an eNodeb, may send a SMC to the UE 102. In response to receiving the SMC, the UE 102 performs the SMC procedure in order to establish secure communications between the UE 102 and the 4G RAN 106.

At 310, the processing of subsequent messages is delayed/suspended. As discussed above, processing of subsequent messages/commands/inquiries (e.g., a UE capability inquiry, . . . ) received by the UE 102 may be delayed for a specified period of time or until the SMC procedure is complete. In some examples, the delay is a short period of time (e.g., 1-10 ms, or some other value).

At 312, a determination is made as to whether the SMC procedure is complete and/or whether or not the delay time has expired. As discussed above, the UE 102 and/or some other device or component may determine when the delay time has elapsed/expired and/or when the SMC procedure has completed. When the SMC procedure is complete and/or when the delay time has expired, the process 300 moves to 314. When the SMC procedure is not complete and/or when the delay time has not expired, the process 300 returns to 312.

At 314, processing of subsequent messages is performed. As discussed above, the UE 102 may process the subsequent messages after the expiration of the delay time and/or after the SMC procedure is complete.

At 316, a determination is made as to whether the voice call has ended. As discussed above, the UE 102 and/or some other device or component may determine when the voice call has ended. When the voice call has ended, the process 300 moves to 318. When the voice call has not ended, the process 300 returns to 316.

At 318, the return to the 5G network is performed. As discussed above, when the call has ended, the 4G connection is released and the UE 102 is re-connected to the 5G network when the UE 102 has 5G coverage.

FIG. 4 illustrates an example process 400 for returning to a 5G network after fallback to a different network. In some instances, the process 400 is performed by the UE 102 and the session management system (e.g., the session management system 108).

At 402, a check is performed as to whether the UE 102 has 5G coverage. According to some configurations, the UE 102 performs the check to determine 5G coverage. In some examples, the UE 102 may determine a signal strength that is available from the 5G network, use other signaling data, and/or use some other technique to determine 5G network coverage.

At 404, a determination is made as to whether the UE 102 has 5G coverage. When the UE 102 does have 5G coverage, the process 400 moves to 406 where the 4G connection is released 118 and the UE 102 connects to the 5G network 104 at 408. When the UE 102 does not have 5G coverage, the process 400 moves to 410.

At 410, a timer is started. As discussed above, the timer may be used by the UE 102 to determine when to check 5G coverage for the UE 102. The timer may be set to any time value (e.g., 5 ms, 10 ms, 60 ms, 1 second, 1 minute, . . . ).

At 412, a determination is made as to whether the timer has expired. When the timer has expired, the process 400 returns to 404 to re-check 5G coverage. When the timer has not expired, the process 400 continues to wait.

Figure 5:
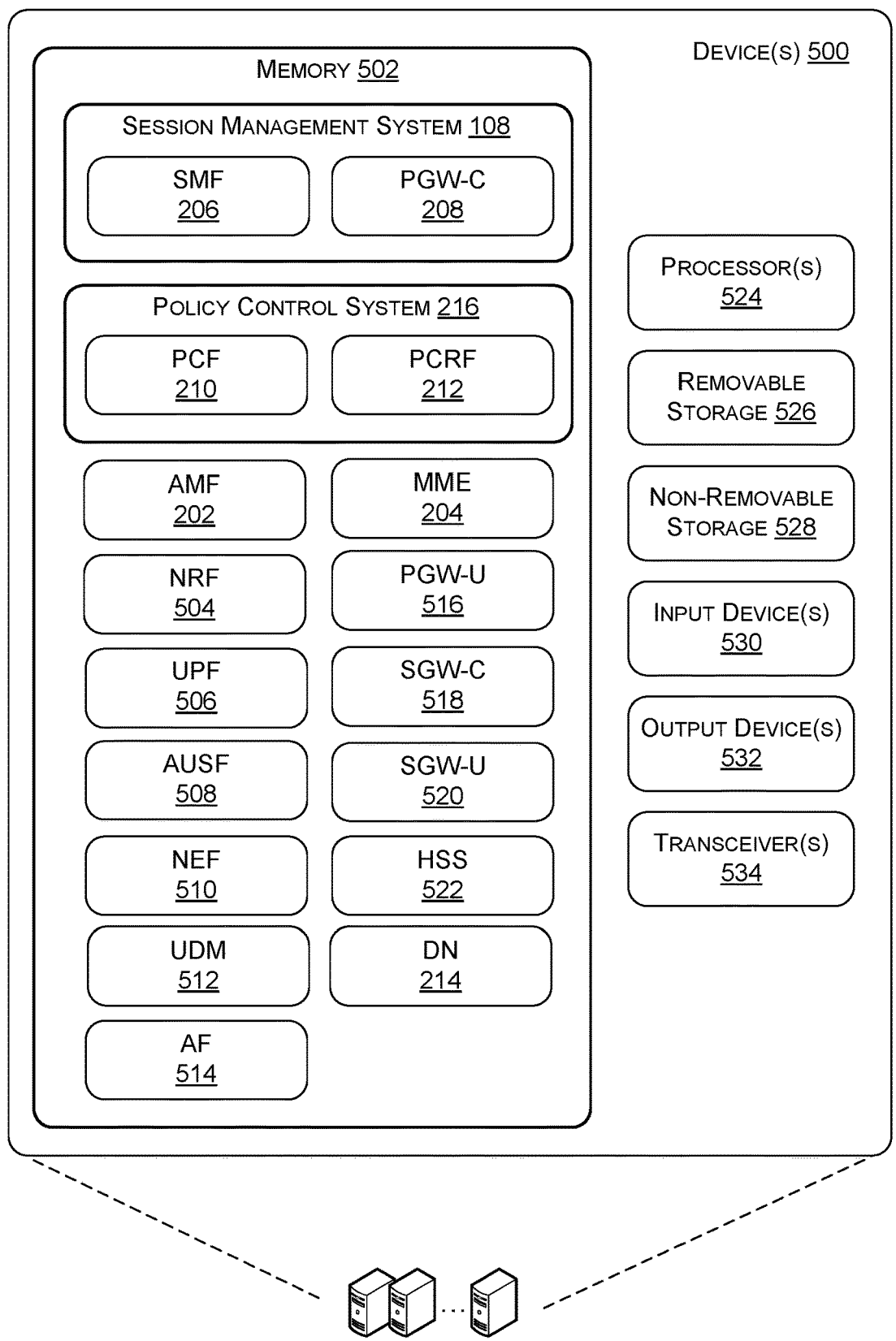
FIG. 5 illustrates example device(s) that use an optimized security mode command procedure.

FIG. 5 illustrates example device(s) 500 that use an optimized security mode command procedure. In some examples, some or all of the functionality discussed in connection with FIGS. 1-4 can be implemented in the device(s) 500. Further, the device(s) 500 can be implemented as one or more server computers, a network element on a dedicated hardware, as a software instance running on a dedicated hardware, or as a virtualized function instantiated on an appropriate platform, such as a cloud infrastructure, and the like. It is to be understood in the context of this disclosure that the device(s) 500 can be implemented as a single device or as a plurality of devices with components and data distributed among them.

As illustrated, the device(s) 500 comprise a memory 502. The memory 502 may include the session management system 108 and the policy control system 216 described above with reference to FIGS. 1-3. As illustrated, the session management system 108 can include the Session Management Function (SMF) 206 and the Packet Data Network (PDN) Gateway Control plane function (PGW-C) 208. Further, the policy control system 216 may include the Policy Control Function (PCF) 210 and the Policy and Charging Rules Function (PCRF) 212. In addition, the memory 502 may include the Application Management Function (AMF) 202, the Mobility Management Entity (MME) 204, and the Data Network (DN) 214 described above with reference to FIG. 2.

In addition to the SMF 206, the PCF 210, and the AMF 202, the memory 502 may further include additional components of a 5th Generation (5G) network, such as any of a Network Resource Function (NRF) 504, at least one User Plane Function (UPF) 506, an Authentication Server Function (AUSF) 508, a Network Exposure Function (NEF) 510, a United Data Management (UDM) 512, and an Application Function (AF) 514. Since various functions of these 5G network components are known to those skill in the art, such details are omitted here.

In addition to the PGW-C 208, the PCRF 212, and the MME 204, the memory 502 may include additional components of a 4th Generation (4G) network, such as a PDN Gateway User plane function (PGW-U) 516, a Serving Gateway Control plane function (SGW-C) 518, a Serving Gateway User plane function (SGW-U) 520, and a Home Subscriber Service (HSS) 522.

In various examples, the memory 502 is volatile (such as RAM), nonvolatile (such as ROM, flash memory, etc.) or some combination of the two. The session management system 108, the policy control system 216, and various other elements stored in the memory 502 can comprise methods, threads, processes, applications, or any other sort of executable instructions. The session management system 108, the policy control system 216, and various other elements stored in the memory 502 can also include files and databases.

The memory 502 may also include various instructions 524, which can be executed by processor(s) 526 to perform operations. In some examples, the processor(s) 526 includes a Central Processing Unit (CPU), a Graphics Processing Unit (GPU), or both CPU and GPU, or other processing unit or component known in the art.

The device(s) 500 can also include additional data storage devices (removable and/or non-removable) such as, for example, magnetic disks, optical disks, or tape. Such additional storage is illustrated in FIG. 5 by removable storage 528 and non-removable storage 530. Tangible computer-readable media can include volatile and nonvolatile, removable and non-removable media implemented in any method or technology for storage of information, such as computer readable instructions, data structures, program modules, or other data. Memory 502, removable storage 528 and non-removable storage 530 are all examples of computer-readable storage media. Computer-readable storage media include, but are not limited to, RAM, ROM, EEPROM, flash memory or other memory technology, CD-ROM, Digital Versatile Discs (DVDs), Content-Addressable Memory (CAM), or other optical storage, magnetic cassettes, magnetic tape, magnetic disk storage or other magnetic storage devices, or any other medium which can be used to store the desired information and which can be accessed by the device(s) 500. Any such tangible computer-readable media can be part of the device(s) 500.

The device(s) 500 also can include input device(s) 532, such as a keypad, a cursor control, a touch-sensitive display, voice input device, etc., and output device(s) 534 such as a display, speakers, printers, etc. These devices are well known in the art and need not be discussed at length here.

As illustrated in FIG. 5, the device(s) 500 can also include one or more wired or wireless transceiver(s) 536. For example, the transceiver(s) 536 can include a Network Interface Card (NIC), a network adapter, a Local Area Network (LAN) adapter, or a physical, virtual, or logical address to connect to the various base stations or networks contemplated herein, for example, or the various user devices and servers. To increase throughput when exchanging wireless data, the transceiver(s) 536 can utilize Multiple-Input/Multiple-Output (MIMO) technology. The transceiver(s) 536 can include any sort of wireless transceivers capable of engaging in wireless, Radio Frequency (RF) communication. The transceiver(s) 536 can also include other wireless modems, such as a modem for engaging in Wi-Fi, WiMAX, Bluetooth, or infrared communication.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   determining to change from a first radio access network (RAN) to a second RAN; and
   establishing, for a user equipment (UE), a communication session on the second RAN, wherein establishing the communication includes:
      performing a security mode command (SMC) procedure to secure communications between the UE and the second RAN;
      while the SMC procedure is being performed and before an SMC-complete message is sent from the UE to the second RAN, causing the UE to delay processing of one or more subsequent commands for a period of time, wherein the period of time is configurable;
      determining that the period of time has elapsed based, at least in part, on a timer;
      determining that the SMC procedure is complete;
      based on at least one of the period of time elapsing or the SMC procedure being complete, causing the one or more subsequent commands to be processed; and
      sending the SMC-complete message to the second RAN,
      wherein the one or more subsequent commands are received by the UE after receiving a SMC from the second RAN and before the SMC procedure is completed.

2. The method of claim 1, wherein determining to change from the first RAN to the second RAN is based at least in part on a request by the UE to establish a voice call.

3. The method of claim 1, wherein the first RAN is a 5G RAN, and the second RAN is a 4G Long Term Evolution (LTE) network.

4. The method of claim 1, wherein the period of time is based, at least in part, on a time to complete the SMC procedure.

5. A system, comprising:
   one or more processors; and
   a plurality of programming instructions that, when executed by the one or more processors, cause the system to perform operations comprising:
      determining to change from a first radio access network (RAN) to a second RAN; and
      establishing, for a user equipment (UE), a communication session on the second RAN, wherein establishing the communication includes:
         performing a security mode command (SMC) procedure to secure communications between the UE and the second RAN;
         while the SMC procedure is being performed and before an SMC-complete message is sent from the UE to the second RAN, causing the UE to delay processing of one or more subsequent commands for a period of time, wherein the period of time is configurable;
         determining that the period of time has elapsed based, at least in part, on a timer;
         determining that the SMC procedure is complete;
         based on at least one of the period of time elapsing or the SMC procedure being complete, causing the one or more subsequent commands to be processed; and
         sending the SMC-complete message to the second RAN,
         wherein the one or more subsequent commands are received by the UE after receiving a SMC from the second RAN and before the SMC procedure is completed.

6. The system of claim 5, wherein determining to change from the first RAN to the second RAN is based at least in part on a request by the UE to establish a voice call.

7. The system of claim 5, wherein the first RAN is a 5G RAN, and the second RAN is a 4G Long Term Evolution (LTE) network.

8. The system of claim 5, wherein the period of time is based, at least in part, on a time to complete the SMC procedure.

9. A non-transitory computer storage medium having a plurality of programming instructions stored thereon that, when executed by one or more processors of a system, cause the system to perform operations comprising:
   determining to change from a first radio access network (RAN) to a second RAN;
   establishing, for a user equipment (UE), a communication session on the second RAN, wherein establishing the communication includes:
   performing a security mode command (SMC) procedure to secure communications between the UE and the second RAN;
   while the SMC procedure is being performed, causing the UE to delay processing of one or more subsequent commands for a period of time,
   wherein the one or more subsequent commands are received by the UE after receiving a SMC from the second RAN and before the SMC procedure is completed, and
   determining that the period of time has elapsed based, at least in part, on a timer;
   determining that the SMC procedure is complete; and
   causing the one or more subsequent commands to be processed.

10. The non-transitory computer storage medium of claim 9, wherein determining to change from the first RAN to the second RAN is based at least in part on a request by the UE to establish a voice call.

11. The non-transitory computer storage medium of claim 9, wherein the period of time is based, at least in part, on a time to complete the SMC procedure.

* * * * *